May 26, 1964 D. G. WOELFEL 3,134,552
INTERCHANGEABLE MAGAZINE AND GUIDE MEANS FOR ENDLESS FILM
Filed March 15, 1961 7 Sheets-Sheet 1
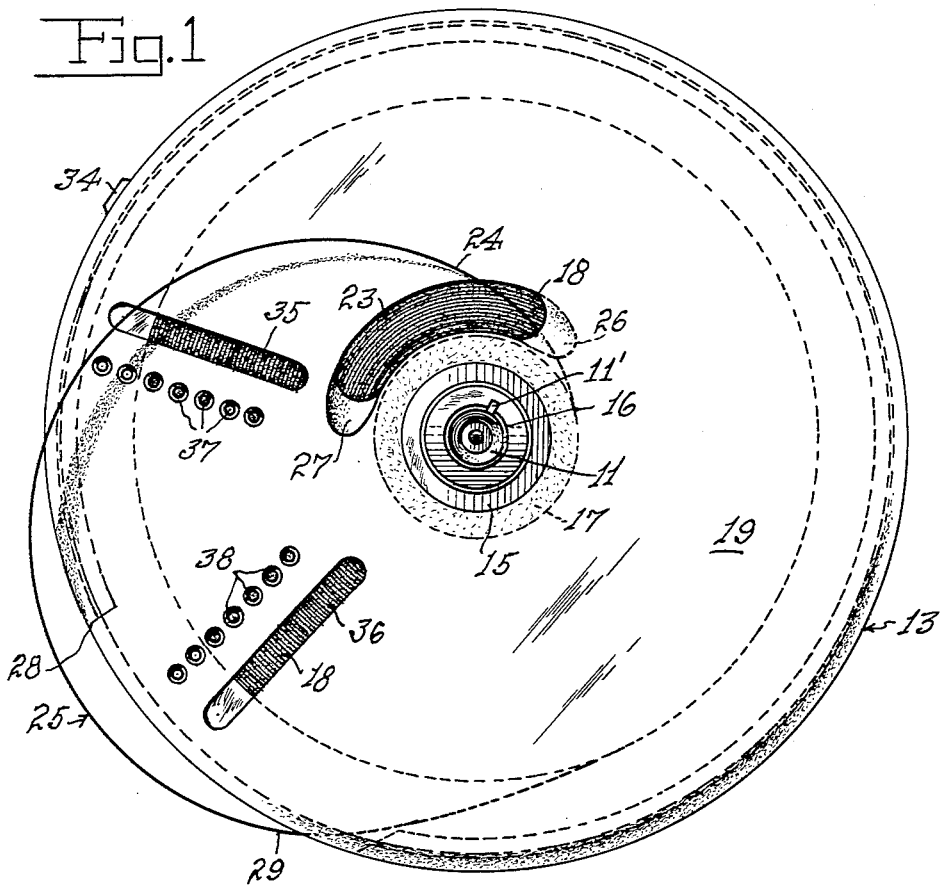
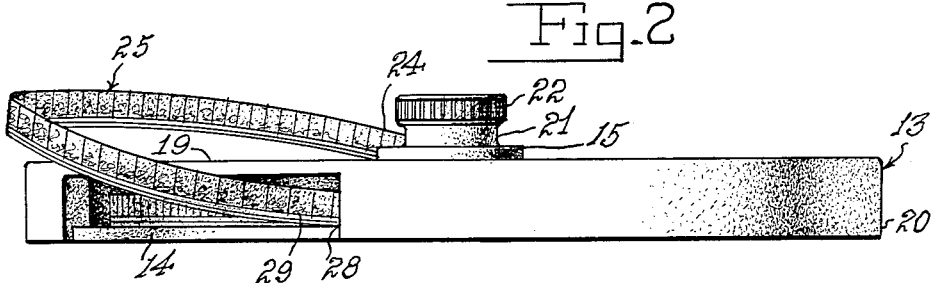
INVENTOR.
Donald G. Woelfel
BY Jacob & Jacob
ATTORNEYS.

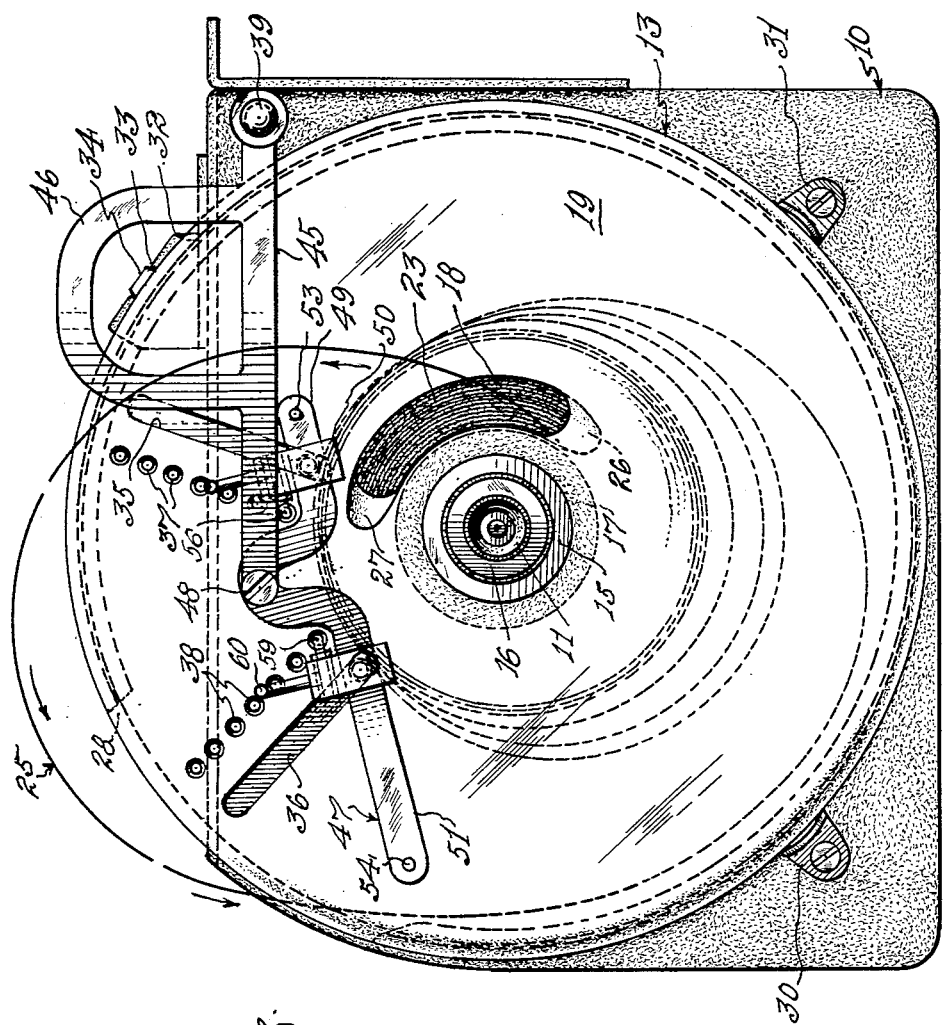

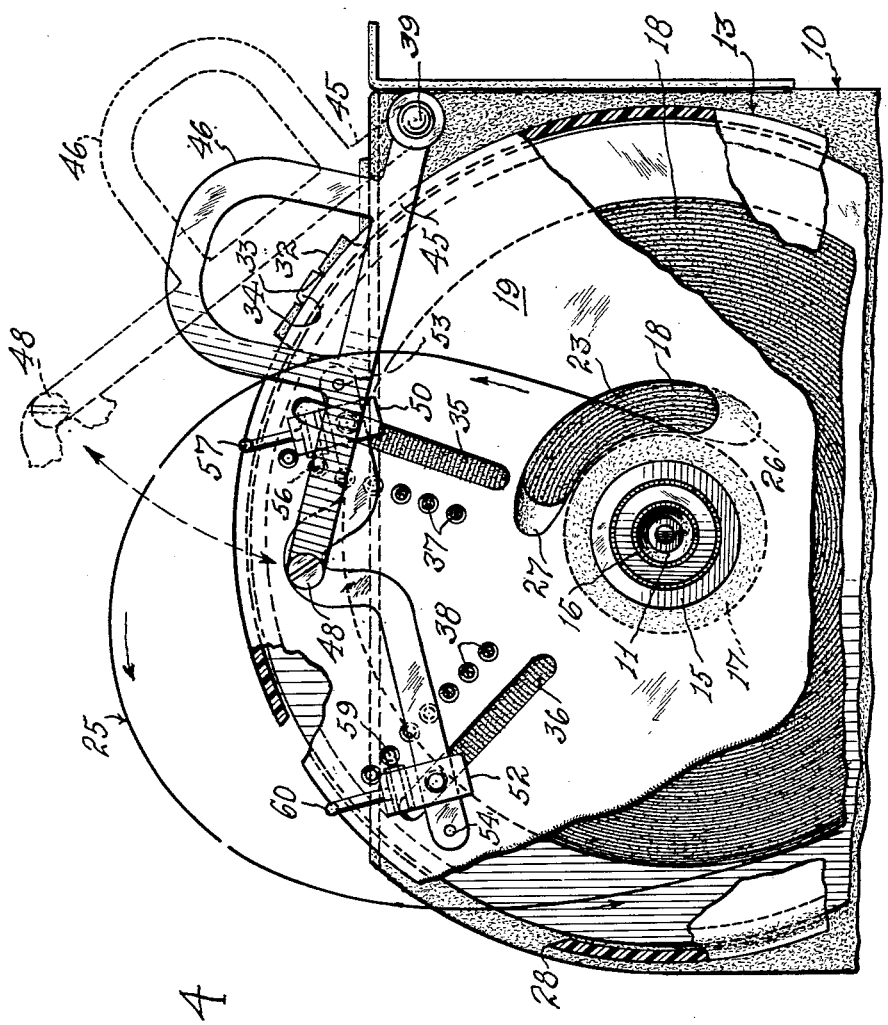

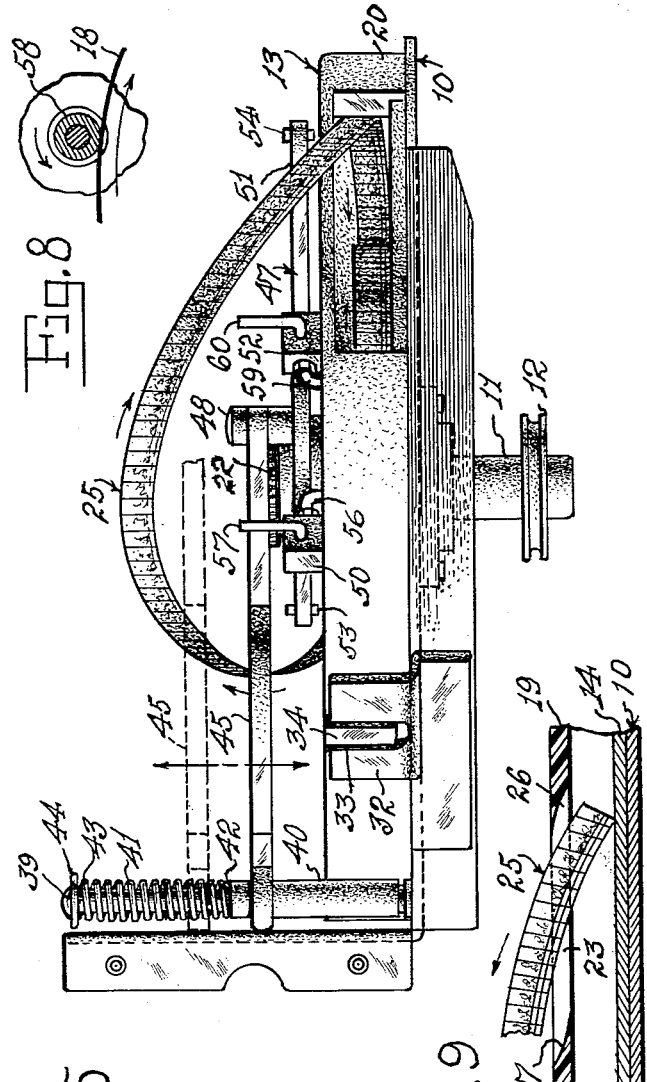

May 26, 1964  D. G. WOELFEL  3,134,552
INTERCHANGEABLE MAGAZINE AND GUIDE MEANS FOR ENDLESS FILM
Filed March 15, 1961  7 Sheets-Sheet 5
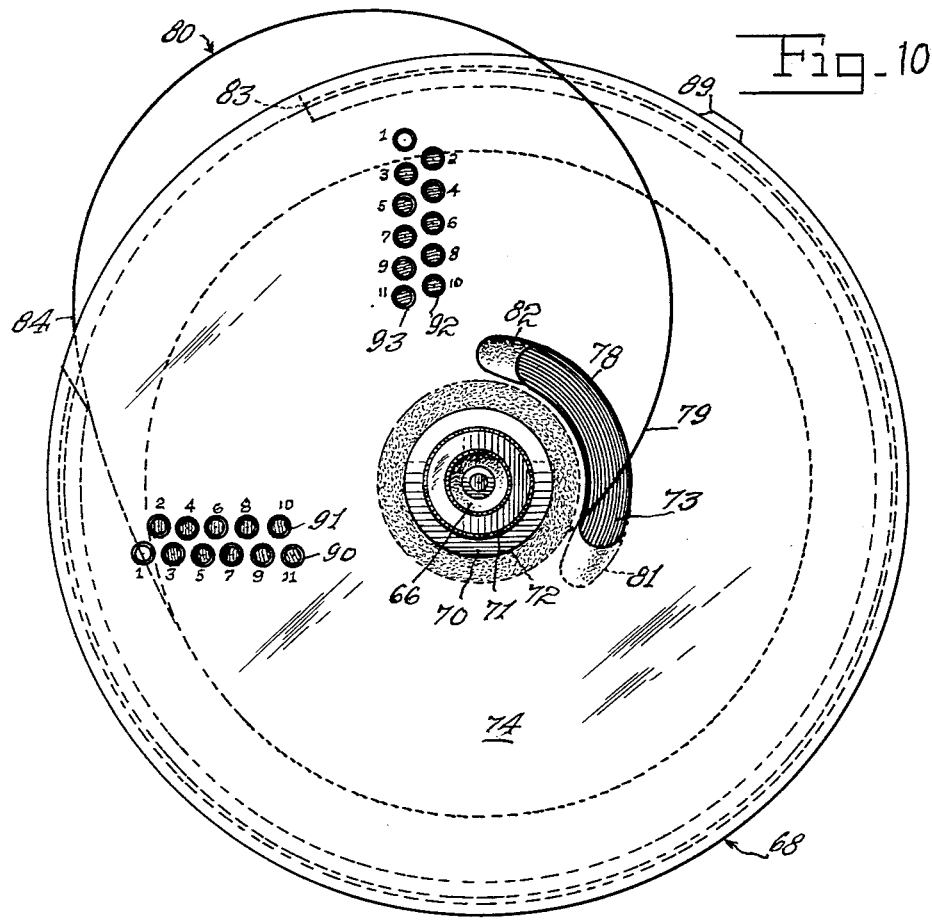
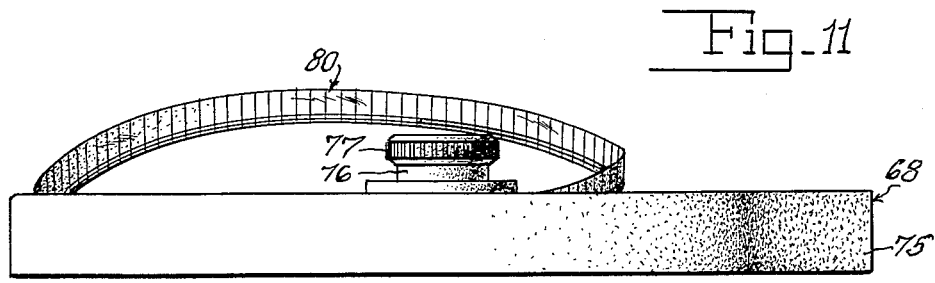
INVENTOR.
Donald G. Woelfel
BY Jacobi & Jacobi
ATTORNEYS.

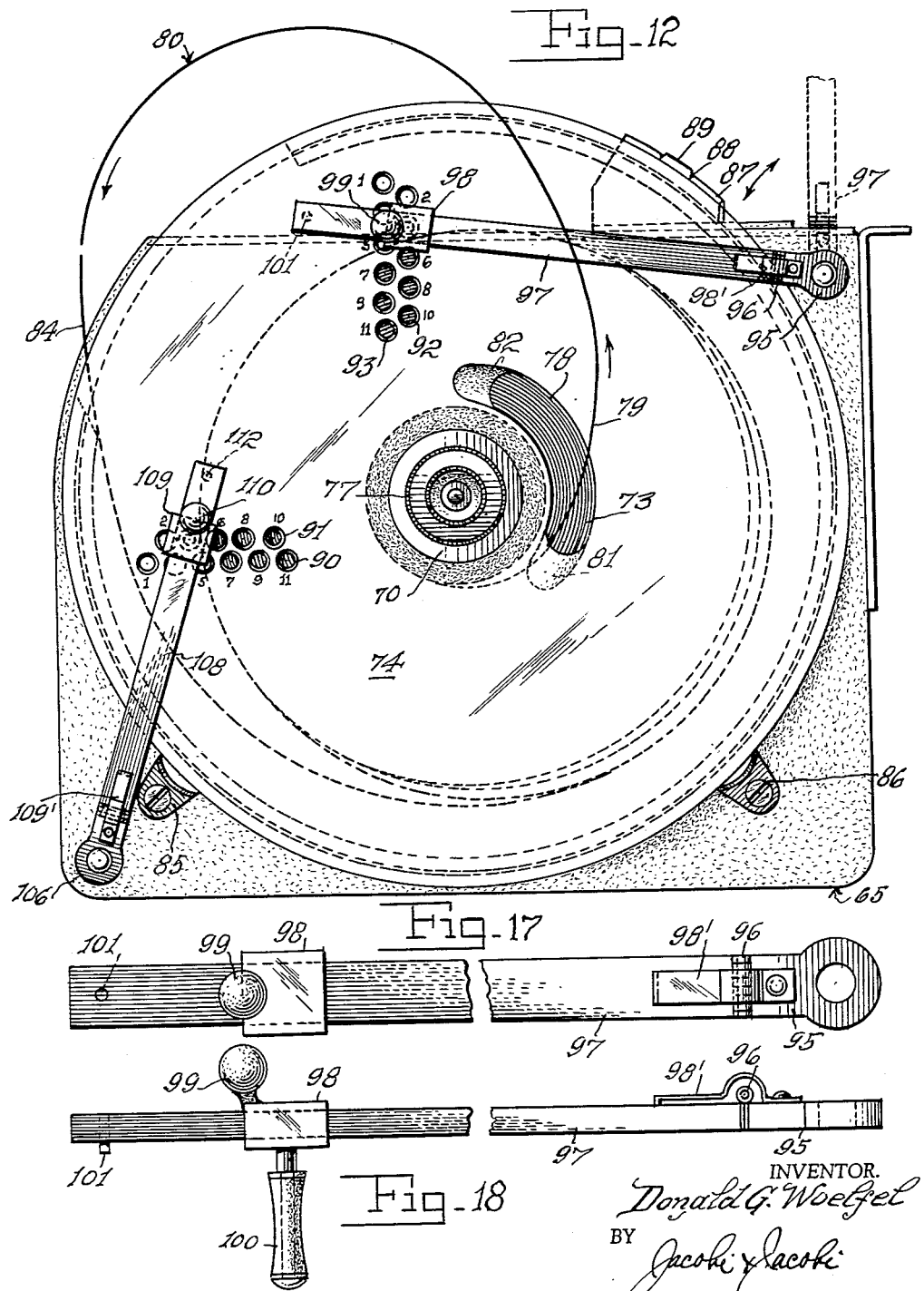

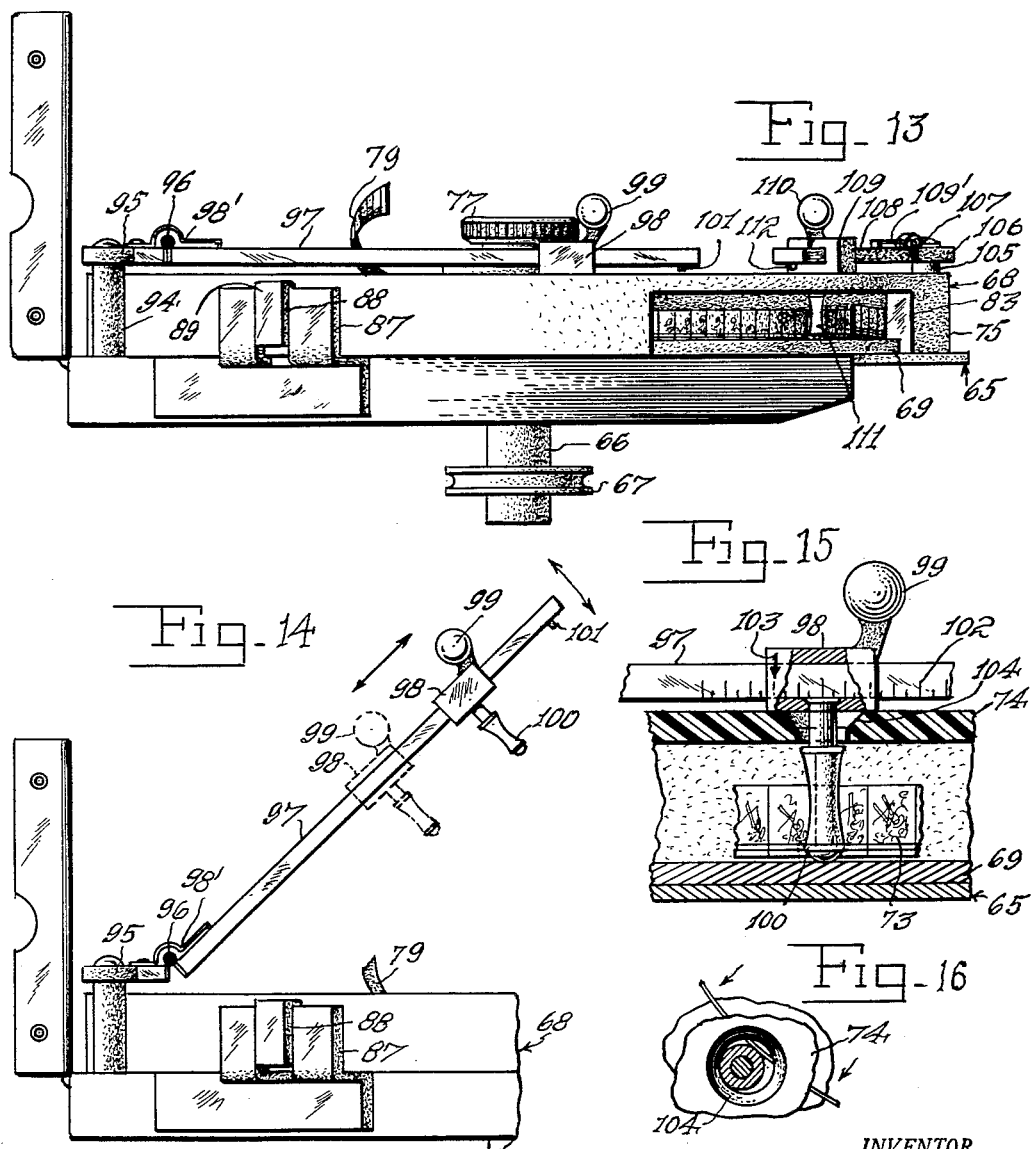

United States Patent Office 3,134,552
Patented May 26, 1964

3,134,552
INTERCHANGEABLE MAGAZINE AND GUIDE
MEANS FOR ENDLESS FILM
Donald G. Woelfel, Yorktown Heights, N.Y., assignor to
MPO Videotronics, Inc., New York, N.Y., a corporation of New York
Filed Mar. 15, 1961, Ser. No. 95,974
5 Claims. (Cl. 242—55.19)

This invention relates to the handling and feeding of endless films, such as are commonly used in repeater type motion picture projectors and more particularly to an interchangeable magazine and guide means for such endless film, the magazine being utilized to store and transport the film and the guide means being installed on the projector and serving to facilitate installation or removal of the magazine from the projector, thereby providing a convenient and economical means for facilitating the changing of endless films.

Various types of motion picture apparatus in which the film is supplied as an endless coil having a loop of such film fed through the projection apparatus have heretofore been utilized but the magazines utilized in these prior art devices have included relatively complex systems of levers and guide rollers, as well as drive means for the film coil with the result that these prior art devices have been relatively costly and consequently, it has been common practice to supply one magazine with each projector and where only a single film is to be utilized, this prior art structure has been reasonably satisfactory. However, when it is desired to change films, it has been necessary to cut and remove the old film and after installation of the new film, the same must be spliced to provide an endless film and this operation requires considerable skill and dexterity in order to properly install the film coil without collapsing of the same which would result in a tangled mass exceedingly difficult to recoil in a proper manner and furthermore, the splicing operation requires some degree of skill in order to provide a proper splice and without damage to the film. Since it is frequently desired to change the film in the field, a skilled person is not usually present for performing this operation and consequently, considerable difficulty has been experienced in utilizing this type of film handling mechanism.

This type of apparatus is frequently utilized by salesmen or other persons for the purpose of presenting a subject pictorially and normally such persons are not trained technicians and do not have the necessary skill or dexterity to successfully accomplish the film changing operations and as a result, attempts have heretofore been made to provide magazines for endless film of the type under consideration but these prior art magazines have also included the drive means for the film which resulted in a relatively costly and heavy package and materially increased the operating costs due to the fact that a large number of relatively expensive drive mechanisms must be supplied, whereas if the drive mechanism could remain a permanent part of the projection apparatus and the film supplied in a relatively simple interchangeable magazine, the cost and weight thereof would be materially reduced.

It is accordingly an object of this invention to provide an interchangeable magazine and guide means for endless film in which the magazine may be utilized to store and transport the film and which may be conveniently applied to or removed from the projection apparatus with which the same is to be used.

A still further object of the invention is the provision of an interchangeable magazine and guide means for endless film which may be utilized with existing motion picture projectors with only a slight modification thereof to accommodate the guide means and interchangeable magazine.

A further object of the invention is the provision of an interchangeable magazine and guide means for endless film in which the guide means is permanently installed on a motion picture projector and serves to facilitate installation or removal of the interchangeable magazine.

A still further object of the invention is the provision of an interchangeable magazine and guide means for endless film in which the guide means is installed as a permanent part of a motion picture projection apparatus, the guide means being conveniently adjustable to engage and properly guide film coils of various sizes contained in interchangeable magazines.

Another object of the invention is the provision of an interchangeable magazine and guide means for endless film in which the guide means is permanently installed on a motion picture projector and includes guide rollers for engaging the film coil in an interchangeable magazine, the magazine including means for facilitating location of the guide rollers in proper position to engage the film coil of a particular size contained in the magazine.

Another object of the invention is the provision of an interchangeable magazine and guide means for endless film in which installation of the magazine in the motion picture projector requires no handling of the film, other than threading of film loop through the film transporting mechanism of the projector.

Another object of the invention is the provision of an interchangeable magazine and guide means for endless film in which the magazine merely includes a driven turntable for frictionally driving the film coil and a cover member, including slots and apertures for facilitating location of the guide means with relation to the film coil.

Further objects and advantages of the invention will be apparent from the following description taken in conjunction with the accompanying drawings wherein:

FIG. 1 is a top plan view of an interchangeable film magazine constructed in accordance with this invention;

FIG. 2 a side elevational view of the film magazine shown in FIG. 1;

FIG. 3 a top plan view showing a film guide means constructed in accordance with this invention and also showing an interchangeable magazine installed in operative position and with the film guide means engaging a film coil in the magazine;

FIG. 4 a fragmentary top plan view similar to FIG. 3, but showing the film guide means engaging a film coil of larger size and also showing in dotted lines the position of the film guide means during removal or installation of the film magazine;

FIG. 5 a side elevational view showing the film guide means, as well as the interchangeable magazine in operative position and showing in dotted lines a portion of the guide means in position for removal or installation of the film magazine;

FIG. 6 a fragmentary sectional view showing the film engaging guide rollers, as well as the roller carrying slides and the pins for engaging apertures in the film magazine to properly position the guide rollers in accordance with the size of film coil contained in the magazine;

FIG. 7 a fragmentary sectional view similar to FIG. 6, but showing only the film engaging guide rollers and the slides for supporting the same;

FIG. 8 a fragmentary sectional view taken substantially on the line 8—8 of FIG. 7 and showing the manner in which a film roller engages the film coil;

FIG. 9 a fragmentary sectional view showing the manner in which the film loop passes through the slot in the cover plate of the film magazine;

FIG. 10 is a top plan view of a modified form of interchangeable film magazine constructed in accordance with this invention;

FIG. 11 a side elevational view of the film magazine shown in FIG. 10;

FIG. 12 a top plan view showing a modified form of film guide means constructed in accordance with this invention and also showing the modified interchangeable magazine of FIG. 10 installed in operative position and with the film guide means engaging a film coil in the magazine;

FIG. 13 a side elevational view showing the modified film guide means and modified interchangeable magazine in operative position and showing the manner in which the film guide means engages a coil of film within the magazine;

FIG. 14 a fragmentary elevational view showing the manner in which the modified film guide means is moved out of the way to permit replacement of the film magazine;

FIG. 15 a fragmentary sectional view showing the manner in which the film guide means projects into the film magazine to engage a coil of film therein;

FIG. 16 a fragmentary top plan view showing one of the apertures in the cover plate of the film magazine and the manner in which a film guide roller projects through such aperture and engages a film coil within the magazine;

FIG. 17 a top plan view of one of the bars and slides mounted thereon constituting a part of the film guide mechanism of FIG. 12; and FIG. 18 a side elevational view of the bar and slide shown in FIG. 17, together with the film coil engaging roller mounted on the slide.

With continued reference to the drawings and particularly FIG. 5, there is shown an interchangeable magazine and guide means for endless film constructed in accordance with this invention and which may well include a base plate 10 for attachment to a conventional motion picture projector in a substantially horizontal position and rotatably mounted on the base plate 10 and projecting above the upper surface thereof is a spindle 11 provided with a pulley 12 or other suitable means for facilitating driving of the spindle 11 from the drive mechanism of the motion picture projector. The base plate 10 may be installed on a conventional motion picture projector with a slight modification thereof and remains a permanent part of such projector. The base plate 10 is also to support the film guide means of this invention which will be later described.

With particular reference to FIGS. 1 and 2, there is shown a film magazine 13 constructed in accordance with this invention and such magazine may well comprise a turntable 14 consisting essentially of a flat disk and being provided at the center thereof with a hub 15. The hub 15 is provided with an aperture 16 for receiving the spindle 11 and suitable means, such as a key 11', may be provided for coupling the spindle 11 to the hub 15 of the turntable 14 in order to drive the turntable 14 upon rotation of the spindle 11. A bushing 17 surrounds the hub 15 and serves to engage and position a coil of film 18 supported on the turntable 14.

The film magazine 13 also includes a film housing comprising a top cover plate 19 having a downturned marginal flange 20 and the cover plate 19 and flange 20 may be conveniently molded or otherwise formed from a suitable plastic or if desired, may be made from any other suitable material. The housing is secured in position by means of a suitable nut 21 threadedly engaging the hub 15, as well as the cover plate 19 and having a finger engaging portion 22 for facilitating manipulation of the nut 21 and as clearly shown in FIG. 2, the marginal flange 20 extends downwardly and surrounds the outer periphery of the turntable 14, thereby enclosing the turntable, as well as the coil of film 18 supported thereon. The cover plate 19 is provided with an arcuate slot 23 adjacent the center thereof and slot 23 serves to permit passage of one end 24 of a film loop 25 outwardly of the magazine from the center of the film coil 18. The arcuate slot 23 is provided with beveled ends 26 and 27 as best shown in FIGS. 1 and 9, to facilitate passage of the end 24 of the film loop 25 without undue wear or damage thereto. As shown in FIG. 2, the flange 20 of the housing is provided with a slot 28 for passage of the other end 29 of the film loop 25 inwardly of the magazine to the outside of the film coil.

As best shown in FIG. 3, the base plate 10 is provided with upstanding ears 30, 31 and 32 for engaging the flange 20 of the magazine 13 in order to securely support the same on the base plate 10 and the ear 32 is provided with an upwardly opening spot 33 for receiving a lug 34 provided on the flange 20 to properly orient the cover plate 19.

Again referring to FIG. 1, it is to be noted that the cover plate 19 is provided with spaced outwardly diverging slots 35 and 36 which provide access to the outer circumference of the film coil 18, regardless of the size of such coil and adjacent the slot 35 is a roll of spaced apertures 37 while adjacent the slot 36 is a similar row of spaced apertures 38. The purpose of slots 35 and 36, as well as the rows of apertures 37 and 38 will be presently described.

With particular reference to FIGS. 3 to 8, the film guide means may well comprise an upstanding post 39 mounted on the base plate 10 and slidably and rotatably carried by the post 39 is a sleeve 40. The sleeve 40 is urged downwardly on the post 39 by a compression spring 41 received around the post 39 with the lower end 42 of the spring 41 engaging the sleeve 40 and with the upper end 43 of the spring 41 engaging a washer 44 secured on the upper end of the post 39. An arm 45 is fixed to the sleeve 40 and extends therefrom above the cover plate 19 of the film magazine 13 and the arm 45 is provided with a finger engaging loop 46 for facilitating manipulation thereof in a manner to be presently described.

A bar 47 is pivotally mounted intermediate the length thereof at 48 on the arm 45 adjacent the outer end thereof and slidably mounted on the end 49 of the bar 47 is a slide 50 and slidably mounted on the opposite end 51 of the bar 47 is a similar slide 52. A stop 53 may be provided on the end 49 of the bar 47 to prevent outward movement of the slide 50 beyond a predetermined point and in a similar manner, a stop 54 may be provided on the end 51 of the bar 47 to prevent outward movement of the slide 52 beyond a predetermined point. As best shown in FIG. 6, the slide 50 is provided with a downwardly projecting film engaging guide roller 55 which extends through the slot 35 in the cover plate 19 to engage the periphery of the film coil 18 as clearly shown in FIGS. 3 and 6. The slide 50 is provided with a downwardly projecting pin 56 which is selectively received in one of the apertures 37 to properly position the guide roller 55 with respect to the film coil 18. The slide 50 is also provided with finger engaging means 57 to facilitate positioning thereof on the bar 47 and insertion of the pin 56 in the appropriate aperture 37. In a similar manner, slide 52 is provided with a downwardly projecting film engaging guide roller 58 which extends downwardly through the slot 36 to engage the film coil 18 and the slide 52 is provided with a downwardly extending pin 59 which is received in the appropriate aperture 38 to locate the guide roller 58 in accordance with the size of the film coil 18. Also provided on the slide 52 is a finger engaging member 60 to facilitate positioning of the slide 52 on the bar 57 and also positioning of the pin 59 in the appropriate aperture 38.

As shown in FIG. 3, a relatively small film coil 18 is contained in the magazine 13 and for use with a film coil of this size, the pins 56 and 59 are positioned in the innermost apertures 37 and 38 which results in positioning the film engaging guide rollers 55 and 58 in the proper position to engage the periphery of the film coil 18 and retain the same in proper position in the magazine 13 during operation of the apparatus. In the course of such operation, the film is fed outwardly from the inside of the film coil 18 with the film loop 25 passing through the projection apparatus and returning to the outside of the film coil 18 through the slot 28 in the flange 20 of the film magazine 13. The turntable 14 is driven by the spindle 11 to frictionally drive the film coil 18 thereby rewinding the film loosely thereon, but during this operation, the film coil 18 is held in proper position and prevented from shifting in such a manner as to impede feeding of the film loop by means of the guide rollers 55 and 58 engaging the periphery of the film coil 18. In FIG. 4 there is shown a film coil 18 of considerably larger size and as clearly shown, the guide rollers 55 and 58 are positioned in engagement with the periphery of the film coil 18 by reception of the pins 56 and 59 in next to the outermost apertures 37 and 38. Manipulation of the slides 50 and 52 to properly position the guide rollers 55 and 58, as well as the locating pins 56 and 59 is conveniently accomplished by utilizing the finger engaging members 57 and 60 on the slide, 50 and 52 respectively. It is to be understood, that the film magazine 13 is supplied for use with a film coil 18 positioned therein and in order to facilitate installation of such magazine in a motion picture projector, the appropriate apertures 37 and 38 will be marked in some convenient and easily recognizable manner to indicate which apertures are to be utilized for receiving the locating pins 56 and 59 in order to properly position the guide rollers 55 and 58 for the particular size of film coil contained in the film magazine. The marking of the apertures 37 and 38 may be in any convenient manner, such as by colored dots or other suitable indicia.

When it is desired to remove the film magazine 13 from the projection apparatus and to substitute another film magazine, it is only necessary for the user to grasp the finger engaging loop 46 and raise the arm 45 against the action of spring 41 which will result in removing the pins 56 and 59 from the apertures 37 and 38 and in removing the guide rollers 55 and 58 from the slots 35 and 36. At this time, the arm 45 as well as the bar 47 and elements carried thereby may be swung outwardly to the position shown in dotted lines in FIG. 4, whereupon the film magazine 13 may be removed upwardly from the spindle 11 and a new film magazine substituted therefor with the lug 34 inserted in the slot 33 in the ear 32 to properly orient the film magazine 13 on the spindle 11 and base plate 10. Thereafter, the arm 45 and bar 47 may be swung inwardly over the film magazine and lowered into position with the film engaging rollers 55 and 58 projecting downwardly through the slots 35 and 36 and with the pins 56 and 59 received in the appropriate apertures 37 and 38 to locate the guide rollers 55 and 58 in engagement with the periphery of the film coil 18 and in accordance with the size of such film coil. Thereafter, it is only necessary to thread the film loop 25 through the film transport mechanism of the projector in order to place the same in operation.

It will be seen that by the above described invention, there has been provided a film guide mechanism which may be conveniently installed as a permanent part of a motion picture projector and there is also provided a film magazine for containing a coil of endless film which may be conveniently installed or removed from the projector and also including means to facilitate positioning of the guide means for the film coil in accordance with the size or diameter of such film coil. The film magazine serves to retain and protect the film coil and also provides a relatively inexpensive means for conveniently installing films of different lengths in a motion picture projection apparatus. Installation of the film magazine in the projection apparatus requires little more skill than is necessary in installing a conventional reel of film and also the film magazine may be conveniently dis-assembled to permit the installation of different films therein prior to supplying of the loaded film magazine to the ultimate user.

With particular reference to FIG. 13, there is shown a modified form of interchangeable magazine and guide means for endless film constructed in accordance with this invention and which may well include a base plate 65 for attachment to a conventional motion picture projector in a substantially horizontal position and rotatably mounted on the base plate 65 and projecting above the upper surface thereof is a spindle 66 provided with a pulley 67 or other suitable means for facilitating driving of the spindle 66 from the drive mechanism of the motion picture projector. The base plate 65 may be installed on a conventional motion picture projector with slight modification thereof and remains a permanent part of such projector. The base plate 65 also serves to support the modified film guide means of this invention which will be later described.

With particular reference to FIGS. 10 and 11, there is shown a modified form of film magazine 68 constructed in accordance with this invention and such magazine may well comprise a turntable 69, as shown in FIG. 13, consisting essentially of a flat disk and being provided at the center thereof with a hub 70. The hub 70 is provided with an aperture 71 for receiving the spindle 66 and suitable means, not shown, may be provided for coupling the spindle 66 to the hub 70 of the turntable 69 in order to drive the turntable 69 upon rotation of the spindle 66. A bushing 72 surrounds the hub 70 and serves to engage and position a coil of film 73 supported on the turntable 69.

The film magazine 68 also includes a film housing comprising a top cover plate 74 having a downturned marginal flange 75 and the cover plate 74 and flange 75 may be conveniently molded or otherwise formed from a suitable plastic or if desired, may be made from any other suitable material. The housing may be secured in position by means of a suitable nut 76 threadedly engaging the hub 70, as well as the cover plate 74 and having a finger engaging portion 77 for facilitating manipulation of the nut 76 and as clearly shown in FIG. 13, the marginal flange 75 extends downwardly and surrounds the outer periphery of the turntable 69 thereby enclosing the turntable, as well as the coil of film 73 supported thereon. The cover plate 74 is provided with an arcuate slot 78 adjacent the center thereof and slot 78 serves to permit passage of one end 79 of a film loop 80 outwardly of the magazine from the center of the film coil 73. The arcuate slot 78 is provided with beveled ends 81 and 82 as best shown in FIG. 10, to facilitate passage of the end 79 of the film loop 80 without undue wear or damage thereto. As best shown in FIGS. 10 and 13, the flange 75 of the housing is provided with a slot 83 for passage of the other end 84 inwardly of the magazine 68 to the outside of the film coil 73.

As best shown in FIGS. 12 and 13, the base plate 65 is provided with upstanding ears 85, 86 and 87 for engaging the flange 75 of the magazine 68 in order to securely support the same on the base plate 65 and the ear 87 is provided with an upwardly opening slot 88 for receiving a lug 89 provided on the flange 75 to properly orient the cover plate 74.

Again referring to FIG. 10, it is to be noted that the cover plate 74 is provided with rows of spaced apertures 90, 91, 92 and 93 and it is to be noted that the rows 90 and 91 are parallel and diverge outwardly with respect to the rows 92 and 93 which are also parallel to each other. Furthermore, it is to be noted that the apertures in the row 91 are staggered or positioned between the apertures in the row 90 and the same staggered relationship exists as between the rows of apertures 92 and the row of apertures 93. These apertures are provided for use in connection with the film engaging guide means which will be later described and furthermore, the rows of apertures may be individually numbered for identification purposes to facilitate proper positioning of the film guide engaging mechanism in a manner to be later described.

With particular reference to FIGS. 12, 13 and 14, the film guide means may well comprise an upstanding post 94 mounted on the base plate 65 and pivotally or rotatably mounted on the upper end of the post 94 is a hinge member 95. Hingedly connected to the hinge member 95 by a suitable hinge pin 96 is an elongated bar 97 and a leaf spring 98' or other suitable spring means may be provided in connection with the hinge mounting to urge the bar 97 downwardly with respect to the base plate 65. Slidably mounted on the bar 97 is a slide 98 which may be provided with an upwardly projecting finger engaging knob 99 and a downwardly projecting film engaging guide roller 100. Outward movement of the slide 98 along the bar 97 may be limited by a stop in the form of a pin 101 projecting from the lower side of the bar 97 adjacent the outer end thereof. As best shown in FIG. 15, the bar 97 may be provided with a scale 102 thereon numbered in accordance with the numbering of the apertures in the rows 90, 91, 92 and 93 and the slide 98 may be provided with an index mark 103 to facilitate positioning the slide 98 on the bar 97 in accordance with the location of the desired aperture in one of the rows of apertures in the cover plate 74. As shown in FIG. 15, the film engaging guide roller 100 projects downwardly through one of the apertures in the cover plate 74 and engages the periphery of the film coil 73 and it is to be noted that each of the apertures in the cover plate 74 is provided with a tapered or beveled upper end 104 to facilitate passage of the film engaging guide roller 100 through the aperture. Also as clearly shown in FIGS. 14 and 15, the guide roller 100 is spaced downwardly from the slide 98 in order to prevent interference between the guide roller 100 and the cover plate 74 when the guide roller 100 is in operative position in engagement with the film coil 73. In this manner, the guide roller 100 may freely rotate to guide the film coil 73 without damage thereto.

Also provided on the base plate 65 diagonally opposite the post 94 is a second upstanding post 105 to the upper end of which is pivotally or rotatably secured a hinge member 106. Hingedly connected to the hinge member 106 by a hinge pin 107 is a bar 108 and a leaf spring 109' or other suitable resilient means which serve to urge the bar 108 downwardly with respect to the base plate 65. Slidably mounted on the bar 108 is a slide 109 provided with an upstanding finger engaging knob 110 and with a downwardly projecting film engaging guide roller 111. Outward movement of the slide 109 on the bar 108 beyond a predetermined point is prevented by a stop pin 112 projecting from the bar 108 adjacent the outer end thereof. The film engaging guide roller 111 is adapted to project downwardly through one of the apertures in the cover plate 74 in the same manner as the film engaging guide roller 100 and the operation of the modified form of interchangeable film magazine and film coil guide means will now be described.

In the use of the modified form of the invention shown in FIGS. 10 to 18, it is assumed that a film magazine 68 is provided with a film coil 73 of predetermined length positioned therein and the length of such film coil may be indicated by utilizing one of the designations of the apertures in the rows 90, 91, 92 and 93 of the cover plate 74, or if desired, one aperture in each pair of rows may be designated by a colored dot or by any other desired designation as was described in connection with the first form of the invention. The magazine 68 with the film coil 73 positioned therein is installed on the spindle 66 of the base plate 65 and the bar 97 is moved inwardly and downwardly and the slide 98 is positioned on the bar 97 in such a location that the film engaging guide roller 100 will move downwardly to the desired aperture in the roll 92 or 93 to engage the periphery of the film coil 73. In a similar manner, the bar 108 is moved inwardly and downwardly and the slide 109 positioned thereon to extend downwardly through the appropriate aperture in one of the rows 90 or 91 in the cover plate 74 in order for the film engaging roller 111 to engage the periphery of the film coil 73. In this manner, the film coil 73 is adequately supported and guided against displacement in the film magazine. When it is desired to remove and replace the film magazine 68 it is only necessary to raise the bars 97 and 108 and move the same outwardly of the film magazine 68 in order to permit convenient removal and replacement of the same. The springs 98 and 109 will operate to retain the film engaging rollers 100 and 111 within the film magazine in engagement with the periphery of the film coil 73.

The above described modified form of the invention also provides a film guide mechanism which may be conveniently installed as a permanent part of a motion picture projector and also provides a film magazine for containing a coil of endless film which may be conveniently installed or removed from the projector and also includes simplified means to facilitate positioning of the guide means for the film coil in accordance with the size or diameter of such film coil. Installation of the film magazine in the projection apparatus requires little more skill than is necessary in installing a conventional reel of film and the film coil engaging guide means is relatively simple in construction and convenient and simple to utilize.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. An interchangeable magazine and guide means for endless film including a base plate for attachment to a projector in a substantially horizontal position, a spindle rotatably mounted on said base plate and projecting above the upper surface and means for driving said spindle, said film magazine comprising a turntable, a hub on said turntable, means on said hub releasably engaging said spindle to mount said turntable thereon and provide a driving connection, a bushing received on said hub, a coil of film surrounding said bushing and supported on said turntable and a film housing comprising a top cover plate removably secured to said hub and having a downturned marginal flange surrounding the periphery of said turntable, said cover plate having an arcuate slot adjacent the center for passage of one end of a film loop leading outwardly of said magazine from the center of said coil and said flange having a slot for passage of the other end of the film loop leading inwardly of said magazine to the outside of said coil, upstanding ears on said base plate releasably engaging said flange, one of said ears having an upwardly opening slot, a lug on said flange received in said slot to orient said cover plate, said cover plate having two pairs of spaced outwardly diverging rows of staggered apertures, the apertures in one row of each pair being staggered with respect to the apertures in the other row of each pair, said guide means comprising a bar, means pivotally and hingedly mounting said bar on said base plate for movement radially and axially of said magazine, spring means for urging said bar downwardly with respect to said magazine, a slide on said bar, a film engaging guide roller on said slide projecting downwardly through a selected aperture of one pair to engage the periphery of said film coil, a second bar pivotally and hingedly mounted on said base plate for movement radially and axially of said magazine, spring means for urging said second bar downwardly with respect to said magazine, a slide on said second bar and a film engaging guide roller on said last named slide projecting downwardly through a selected aperture of the other pair to engage the periphery of said film coil.

2. Apparatus as defined in claim 1, in which the apertures in each row are provided with identification means, there being corresponding identification means provided on each of said bars and index means on each slide.

3. An interchangeable magazine and guide means for endless film including a base plate for attachment to a projector in a substantially horizontal position, a spindle rotatably mounted on said base plate and projecting above the upper surface and means for driving said spindle, said film magazine comprising a turntable, a hub on said turntable, means on said hub releasably engaging said spindle to mount said turntable thereon and provide a driving connection, said turntable serving to support a coil of film surrounding said hub and a film housing comprising a top cover plate removably secured to said hub and having a downturned marginal flange surrounding the periphery of said turntable, said cover plate having a slot adjacent the center for passage of one end of a film loop leading outwardly of said magazine from the center of said coil and said flange having a slot for passage of the other end of the film loop leading inwardly of said magazine to the outside of said coil, said cover plate having two pairs of spaced outwardly diverging rows of spaced apertures, the apertures in one roll of each pair being staggered with respect to the apertures in the other row of each pair, said guide means comprising a bar, means pivotally and hingedly mounting said bar on said base plate for movement radially and axially of said magazine, a slide on said bar, a film engaging guide roller on said slide projecting downwardly through a selected aperture of one pair to engage the periphery of said film coil, a second bar pivotally and hingedly mounted on said base plate for movement radially and axially of said magazine, a slide on said second bar and a film engaging guide roller on said last named slide projecting downwardly through a selected aperture of the other pair to engage the periphery of said film coil.

4. An interchangeable magazine and guide means for endless film including a base plate for attachment to a projector substantially in a horizontal position, a spindle rotatably mounted on said base plate and projecting above the upper surface and means for driving said spindle, said film magazine comprising a turntable, a hub on said turntable, means on said hub releasably engaging said spindle to mount said turntable thereon and provide a driving connection, said turntable serving to support a coil of film surrounding said hub and a film housing comprising a top cover plate removably secured to said hub and having a downturned marginal flange surrounding the periphery of said turntable, said cover plate having a slot adjacent the center for passage of one end of a film loop leading outwardly of said magazine from the center of said coil and said flange having a slot for passage of the other end of the film loop leading inwardly of said magazine to the outside of said coil, said cover plate having a radially extending row of spaced apertures, said guide means comprising a bar, means pivotally and hingedly mounting said bar on said base plate for movement radially and axially of said magazine, a slide on said bar movable longitudinally of said bar and a film engaging guide roller on said slide projecting downwardly through a selected aperture to engage the periphery of said film coil.

5. Apparatus as defined in claim 4 in which said apertures are provided with identification means, there being corresponding identification means provided on said bar and index means on said slide.

References Cited in the file of this patent

UNITED STATES PATENTS

| 2,177,505 | Schalie | Oct. 24, 1939 |
| 2,363,627 | Schalie | Nov. 28, 1944 |
| 2,830,812 | Nash et al. | Apr. 15, 1958 |
| 2,917,308 | Woelfel | Dec. 15, 1959 |

FOREIGN PATENTS

| 667,171 | France | June 4, 1929 |
| 749,804 | France | May 15, 1933 |
| 505,659 | Germany | Aug. 21, 1930 |
| 207,869 | Great Britain | Dec. 6, 1923 |